US012768925B1

(12) United States Patent
Reeves et al.

(10) Patent No.: US 12,768,925 B1
(45) Date of Patent: Oct. 20, 2026

(54) SYSTEMS AND METHODS TO DETERMINE A LOCATION OF A DEVICE

(71) Applicant: T-Mobile Innovations LLC, Overland Park, KS (US)

(72) Inventors: Raymond Reeves, Orlando, FL (US); Simon Youngs, Overland Park, KS (US); Mark Peden, Paola, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 550 days.

(21) Appl. No.: 18/069,000

(22) Filed: Dec. 20, 2022

Related U.S. Application Data

(63) Continuation of application No. 16/906,407, filed on Jun. 19, 2020, now Pat. No. 11,567,160.

(51) Int. Cl.
*H04W 64/00* (2009.01)
*G01S 1/04* (2006.01)

(52) U.S. Cl.
CPC ............. *G01S 1/045* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 10,382,571 | B1 * | 8/2019 | Delker | G01S 5/0009 |
| 2008/0248813 | A1 | 10/2008 | Chatterjee | |
| 2020/0264261 | A1 | 8/2020 | Akkarakaran et al. | |
| 2020/0367020 | A1 * | 11/2020 | Ansley | H04W 16/14 |
| 2021/0329586 | A1 * | 10/2021 | Opshaug | H04W 64/00 |

* cited by examiner

*Primary Examiner* — Suhail Khan
(74) *Attorney, Agent, or Firm* — Shook, Hardy & Bacon L.L.P.

(57) ABSTRACT

Methods and systems are provided for determining a location of a device. The methods can include receiving information associated with a device, which can include one or more radio frequency (RF) signal strength values associated with communication between the device and at least one antenna element of an antenna array. The methods can also include, determining, based at least partly on the information associated with the device, a location for the device.

16 Claims, 5 Drawing Sheets

SYSTEMS AND METHODS TO DETERMINE A LOCATION OF A DEVICE

CROSS-REFERENCE TO RELATED APPLICATIONS AND PRIORITY CLAIM

This application is a continuation of U.S. patent application Ser. No. 16/906,407, filed Jun. 19, 2020, and entitled systems and methods to determine a location of a device, the entirety of which is hereby incorporated by reference.

SUMMARY

The present disclosure is directed, in part, to systems and methods to determine a location of a device, substantially as shown in and/or described in connection with at least one of the figures, and as set forth more completely in the claims.

In aspects set forth herein, a location of a device can be determined, at least partly, based on one or more radio frequency (RF) signal strength values associated with communication between the device and an antenna element of an antenna array.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
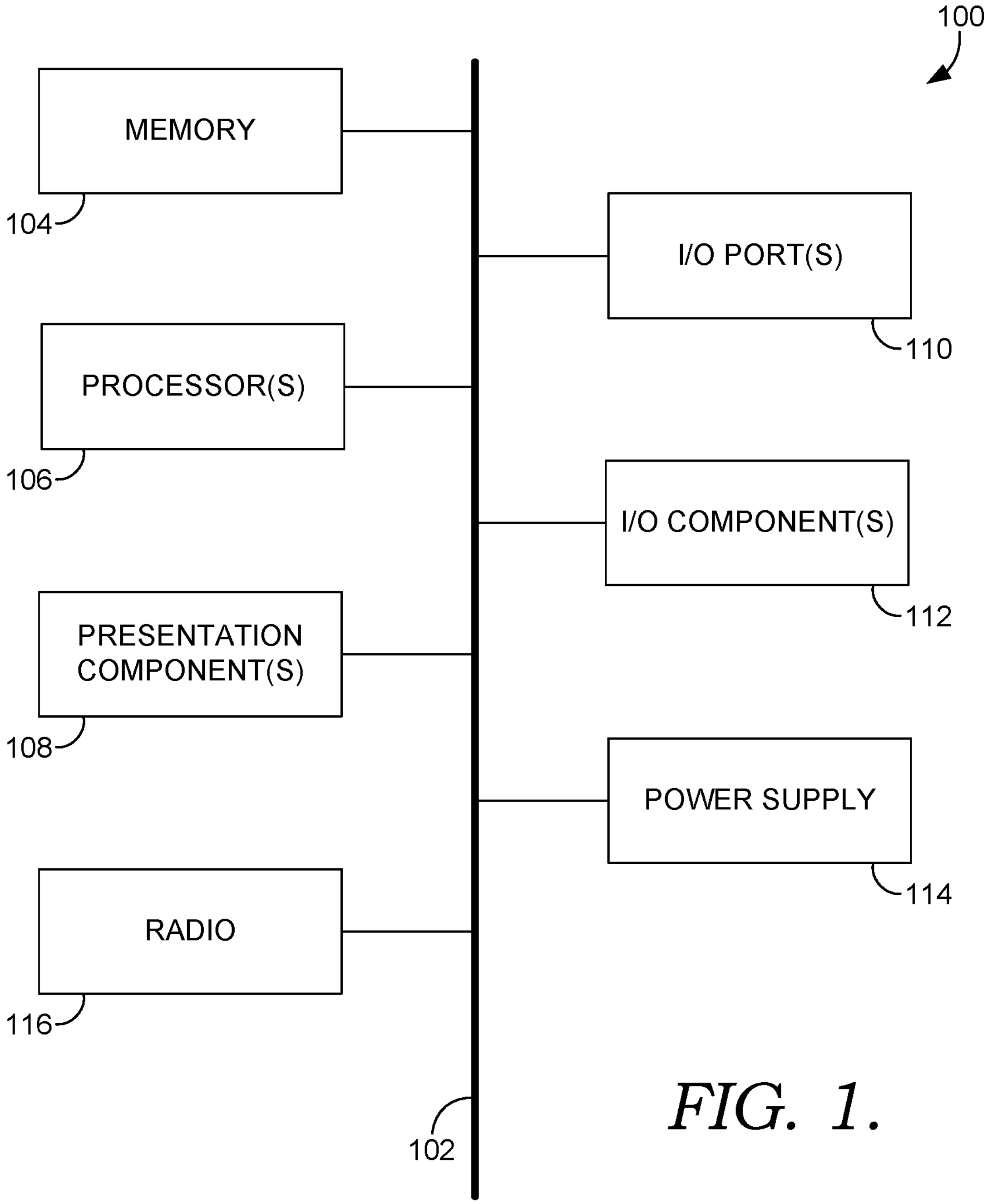
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GPS Global Positioning System
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
NR New Radio
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 31st Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, certain conventional systems rely on GPS to provide location information to a device, e.g., a mobile computing device. However, in certain scenarios, a mobile computing device may not be able to access GPS, e.g., when the device is inside a building or otherwise blocked from a GPS connection. In other scenarios, various computing devices may not have GPS capabilities, including but not limited to various Internet of Things (IoT) devices. Thus, there is a need for alternative systems and methods to determine the location of a device.

The systems and methods disclosed herein can alleviate one or more of the problems discussed above. For instance, in aspects, the systems disclosed herein can determine a location of a device based at least partly on one or more radio frequency (RF) signal strength values associated with communication between the device and an antenna element of an antenna array. In aspects, the systems and methods disclosed herein can utilize the RF signal strength values of the device in question, in combination with RF signal strength values and associated location information from a plurality of other devices, to determine a location for the device in question. In such aspects, the systems and methods disclosed herein can provide and/or assign a location to a device with high precision, while eliminating the need for GPS services for such devices.

Accordingly, in one aspect, a system for determining a location of a device is provided. The system can include an antenna array that includes a plurality of antenna elements that utilize a first wireless communication protocol. The system can further include a processor configured to execute operations that include: receiving information associated with a device, the information including one or more radio frequency (RF) signal strength values associated with communication between the device and at least one antenna element of the plurality of antenna elements; determining, at least partly based on the information associated with the device, a location for the device; and assigning the location to the device.

In another aspect, a method for determining a location of a device is provided. The method can include receiving information associated with a device. The information can include one or more radio frequency (RF) signal strength values associated with communication between the device and at least one antenna element of a plurality of antenna elements of an antenna array. The at least one antenna element of the plurality of antenna elements can utilize a first wireless communication protocol. The method can also include determining, at least partly based on the information associated with the device, a location for the device.

In yet another aspect, a method for determining a location of a device is provided. The method can include receiving information associated with a device, the information including one or more radio frequency (RF) signal strength values associated with communication between the device and at least one antenna element of a plurality of antenna elements of an antenna array, where the at least one antenna element utilizes a 5G wireless communication protocol. The method can also include receiving information associated with the antenna array. The method can also include determining, at least partly based on the information associated with the device and the information associated with the antenna array, a location for the device; and assigning the location to the device.

As used herein, user equipment (UE) (also referenced herein as a user device or device) can include any device employed by an end-user to communicate with a wireless telecommunications network. A UE can include a mobile device, a mobile broadband adapter, an IoT device, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

Referring to FIG. 1, a diagram is depicted of an example computing environment suitable for use in implementations of the present disclosure. In particular, the example computing environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: memory 104, one or more processors 106, one or more presentation components 108, input/output (I/O) ports 110, I/O components 112, and a power supply 114. The bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of the I/O components 112. Also, processors, such as one or more processors 106, have memory. The present disclosure recognizes that such is the nature of the art, and reiterates that FIG. 1 is merely illustrative of an example computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 104 includes computer-storage media in the form of volatile and/or nonvolatile memory. The memory 104 may be removable, nonremovable, or a combination thereof. Exemplary memory includes solid-state memory, hard drives, optical-disc drives, etc. The computing device 100 includes one or more processors 106 that read data from various entities such as bus 102, the memory 104 or the I/O components 112. One or more presentation components 108 presents data indications to a person or other device. Exemplary one or more presentation components 108 include a display device, speaker, printing component, vibrating component, etc. The I/O ports 110 allow the computing device 100 to be logically coupled to other devices including the I/O components 112, some of which may be built in the computing device 100. Illustrative I/O components 112 include a microphone, joystick, game pad, satellite dish, scanner, printer, wireless device, etc.

The radio 116 represents a radio that facilitates communication with a wireless telecommunications network. Illustrative wireless telecommunications technologies include CDMA, GPRS, TDMA, GSM, and the like. The radio 116 might additionally or alternatively facilitate other types of wireless communications including Wi-Fi, WiMAX, LTE, or other VoIP communications. As can be appreciated, in various embodiments, the radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
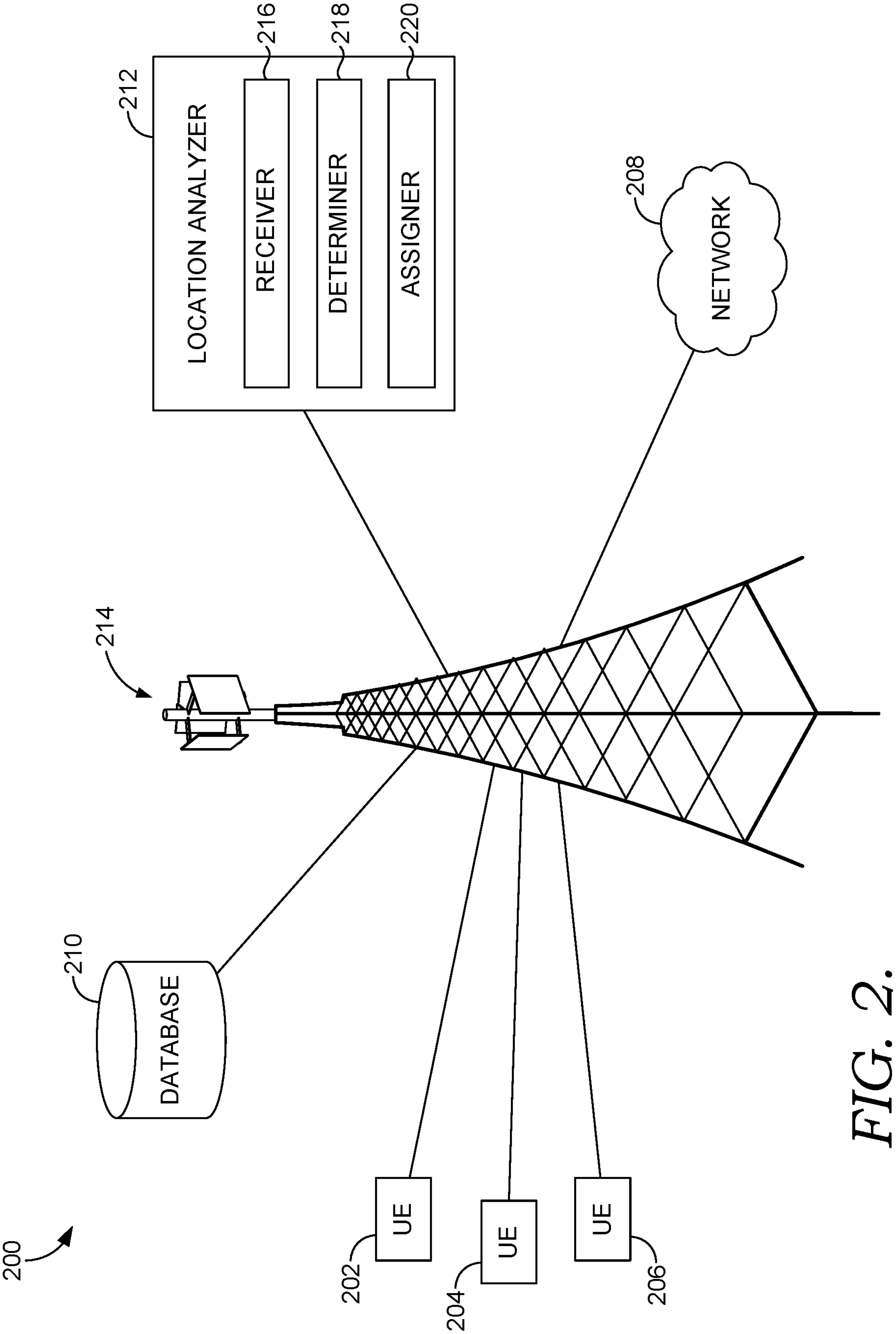
FIG. 2 illustrates a diagram of an exemplary network environment in which implementations of the present disclosure may be employed.

FIG. 2 depicts one example network environment in which implementations of the present disclosure may be employed. Such a network environment is illustrated and designated generally as a network environment 200. The network environment 200 is but one example of a suitable network environment and is not intended to suggest any limitation as to the scope of use or functionality of the invention. Neither should the network environment be interpreted as having any dependency or requirement relating to any one or combination of components illustrated.

The network environment 200 of FIG. 2 includes user devices 202, 204, and 206, a cell site 214, a network 208, a database 210, and a location analyzer 212. In the network environment 200, the user devices 202, 204, and 206 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, an IoT device, a video player, a handheld communications device, a workstation, a router, an access point, or any combination thereof, or any other device that communicates via wireless communications with a cell site, e.g., the cell site 214, in order to interact with a public or private network.

In some aspects, the user devices 202, 204, and 206 can correspond to the computing device 100 of FIG. 1. Thus, in aspects, a user device can include, for example, a display(s), a power source(s) (e.g., a battery), a data store(s), a speaker (s), memory, a buffer(s), a radio(s) and the like. In some implementations, a user device, e.g., one or more of the user devices 202, 204, and 206, comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some aspects, the user devices 202, 204, and 206 in the network environment 200 can optionally utilize the network 208 to communicate with other computing devices (e.g., a mobile device(s), a server(s), a personal computer(s), etc.) through the cell site 214 using any one of a plurality of wireless communication protocols, such as 3G, 4G/LTE, 5G and other related protocols. In aspects, the network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. The network 208 can include multiple networks, as well as being a network of networks, but is shown in more simple form so as to not obscure other aspects of the present disclosure.

The network 208 can be part of a telecommunication network that connects subscribers to their immediate service provider. In some instances, the network 208 can be associated with a telecommunications provider that provides services (e.g., 5G and LTE) to user devices, such as the user devices 202, 204, and 206. For example, the network 208 may provide voice, SMS, and/or data services to user devices or corresponding users that are registered or subscribed to utilize the services provided by a telecommunications provider. The network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some aspects, the cell site 214 can be configured to communicate with user devices, such as the user devices 202, 204, and 206 that are located within the geographical area, or cell, covered by radio antennas of the cell site 214. The cell site 214 may include one or more base stations, base transmitter stations, radios, antennas, antenna arrays, power amplifiers, transmitters/receivers, digital signal processors, control electronics, GPS equipment, and the like. In an aspect, the cell site 214 of the present disclosure may communicate with at least one user device, such as the user device 202 via a wireless communication protocol, such as the 5G wireless communication protocol.

As shown, the cell site 214 is in communication with the location analyzer 212, which comprises various components that are utilized, in various implementations, to perform one or more methods for determining a location of a device, e.g., one or more of the user devices 202, 204, or 206. In aspects, the location analyzer 212 includes a receiver 216, a determiner 218, and an assigner 220. However, in other implementations, more or less components than those shown in FIG. 2 may be utilized to carry out aspects of the systems and methods described herein. Each of the components or sub components of the location analyzer 212 may be a stand-alone or combined processor, server, or other computer processing component that is suitably configured to perform the operations described herein.

In various aspects, the receiver 216 of the location analyzer 212 is generally responsible for receiving information associated with one or more devices, e.g., the user devices 202, 204, and/or 206. In aspects, the information associated with one or more user devices may include one or more radio frequency (RF) signal strength values associated with communication between the device and one or more antenna elements of an antenna array at a cell site, e.g., the cell site 214. In aspects, the RF signal strength value can refer to transmitter power output received by an antenna, e.g., associated with the device and/or associated with the antenna array, and can be expressed in any convenient units including, but not limited to, decibels with reference to one milliwatt (dBm). In the same or alternative aspects, the information associated with the one or more devices can include additional information that may affect the RF signal strength values associated with communication between the device and one or more antenna elements of an antenna array at the cell site, e.g., the cell site 214, including but not limited to, a make and/or model of the device, a make and/or model of the antenna within the device, age of the device, battery life, battery strength being utilized at the time of the communication between the device and an antenna element at the cell site, e.g., the cell site 214, operating system utilized by the device, maintenance version utilized by the device, or a combination thereof.

In various aspects, the information associated with one or more devices may include relative positional information. For instance, certain relative positional information can include, but is not limited to, a detection by the device of a wireless local area network (LAN), such as a Wi-Fi LAN; a detection by the device of a neighboring cell site. In aspects, detection by the device of a wireless LAN can include the device being in range of and/or detecting a Wi-Fi service set identifier (SSID), for example. In various aspects, detection by a device of a neighboring cell site can include the detection and/or communication with a neighboring cell site, e.g., via one or more antenna elements associated with the neighboring cell site.

In aspects, the receiver 216 can receive information from the database 210. In aspects, the database 210 can include any information that is relevant to aid and/or facilitate determining a location of a device. In one aspect, the information associated with the device mentioned above, for which a location is to be determined, can be stored in the database 210.

In various aspects, the database 210 can include information associated with other devices, e.g., devices other than the device with which the systems and methods disclosed herein are determining a location. In such aspects, the database 210 can include information associated with other devices, such as RF signal strength values associated with communications between the respective other devices and the antenna array at the cell site, e.g., the cell site 214. In certain aspects, the information associated with other devices may optionally include location information for the other devices that are associated with specific RF signal strength values associated with communications between the respective other devices and the antenna array at the cell site, e.g., the cell site 214. In one aspect, the information associated with other devices may optionally include GPS coordinates for the other devices and that are associated with RF signal strength values associated with communications between the respective other devices and the antenna array at the cell site, e.g., the cell site 214.

In various aspects, the database 210 can include reference device information, e.g., RF signal strength values associated with communications between a reference device and the antenna array at the cell site, e.g., the cell site 214. In such aspects, the reference device information can include one or more testing devices positioned at known locations when in communication with the antenna array at the cell site, e.g., the cell site 214.

In certain aspects, the database 210 can include information associated with an antenna array at the cell site, e.g., the cell site 214. In various aspects, the information associated with the antenna array can include a location of the antenna array, e.g., latitude and longitude values, an azimuth of the antenna array, an angular direction of the antenna array, or a combination thereof.

In various aspects, any or all of the location information in the database 210 can include an associated confidence score or other statistical metric for indicating the level of confidence in a location assigned to a particular RF signal strength stored in the database 210.

In aspects, the determiner 218 can determine a location of a device, e.g., utilizing information received by the receiver 216. For example, in various aspects, the determiner 218 can determine a location of the device based at least partly on information associated with the device in question. In various aspects, the determiner 218 can analyze the information associated with the device and compare it to information associated with other devices received from the database 210 in order to determine a location for the device in question. For instance, in one aspect, the determiner 218 can analyze one or more RF signal strength values of the device in question and compare such values to the RF signal strength values of other devices, where the determiner 218 may also then determine a location for the device in question based on the location information from one or more of the other devices having similar RF signal strength values.

In various aspects, the determiner 218 can utilize information associated with the antenna array at the cell site, e.g., the cell site 214, to facilitate determining a location for the device. In one aspect, the information associated with the antenna array may be utilized alone or in conjunction with additional information from the database 210. For example, in aspects, the determiner 218 may utilize information associated with the antenna array in addition to information associated with the device, as well as information associated with other devices. In such an example aspect, the determiner 218 may determine a location based on the location information from the other devices in addition to the location information of the antenna array.

In various aspects, the determiner 218 may optionally determine a confidence score associated with the determined location for the device. For instance, in one aspect, the determiner 218 may utilize information from the database 210 to derive a confidence score associated with the determined location of the device. In aspects, such a confidence score or other statistical metric can be based at least partly on the number and/or quality of individual data points relied on in discerning the location of the device, e.g., the number of distinct other devices and associated information that was relied on, as well as the confidence score for location information for such other devices, if available.

In various aspects, the assigner 220 can assign a location for or to the device. In one aspect, the assigner 220 assigns to the device the location determined by the determiner 218. In various aspects, the assigner 220 can assign and/or provide the location for or to the device, and optionally the confidence score, to the device via the network 208. In certain aspects, the assigner 220 can assign and/or provide the location of the device, and optionally the confidence score, to the database 210, e.g., via the network 208.

Figure 3:
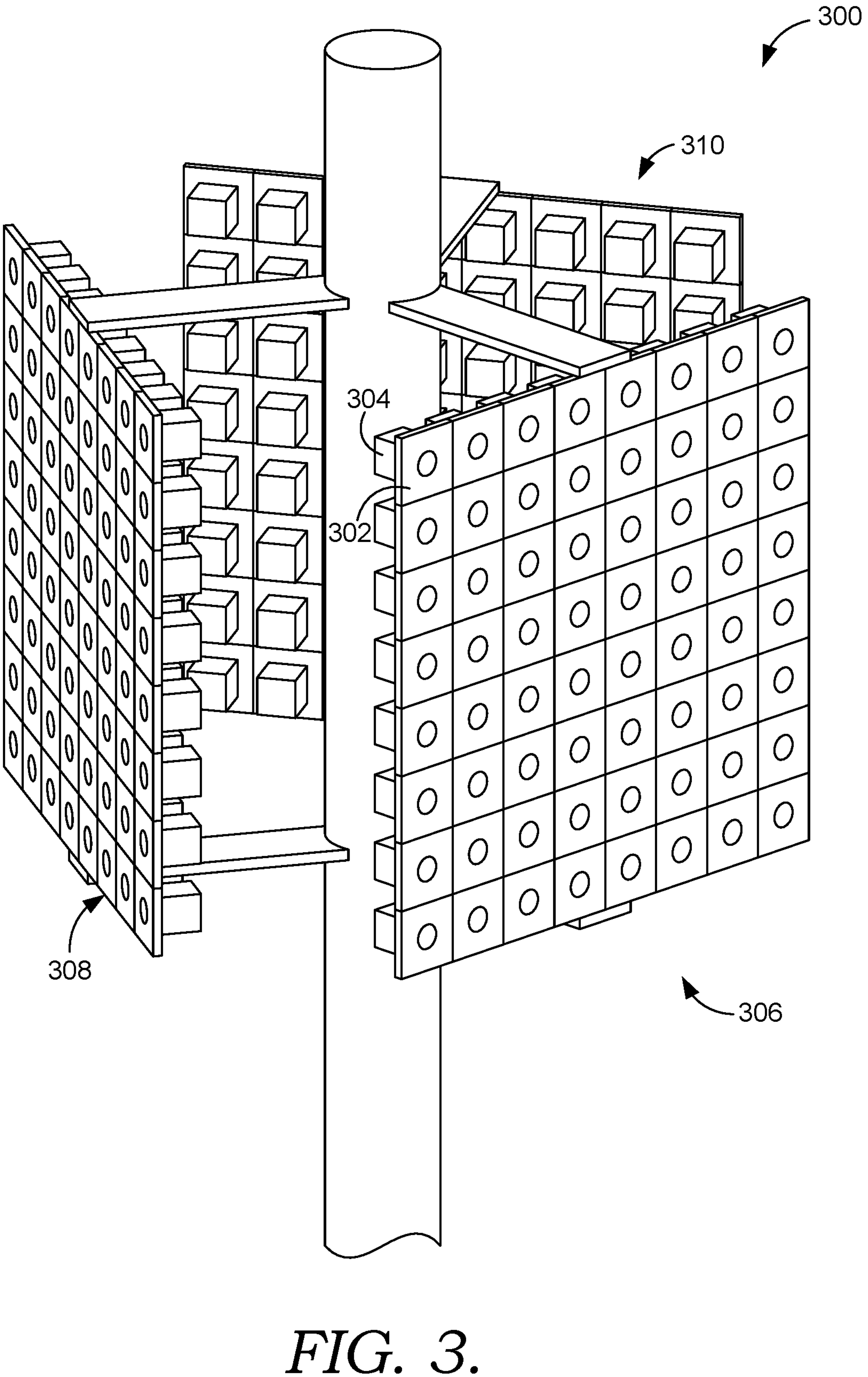
FIG. 3 depicts a schematic representation of a base station suitable for use in aspects of the present disclosure.

FIG. 3 depicts an example base station configuration suitable for use in implementing embodiments of the present disclosure and is designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

In the aspect depicted in FIG. 3, the base station 300 includes a first antenna array 306, a second antenna array 308, and a third antenna array 310. As can be seen in the aspect depicted in FIG. 3, the first antenna array 306 includes one or more antenna elements 302. In aspects, the one or more antennas 302 may be dipole antennas, having a length, for example, of ¼, ½, 1, or 1½ wavelength. In aspects, the antenna array 306 may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz 30 GHz.

By way of a non-limiting example, the antenna array 306 may comprise 64 antenna elements 302 arranged in an 8×8 structure. In other aspects, the antenna array 306 may comprise antenna elements arranged in an 8×4, 4×8, or 4×4 configuration. Each antenna element 302 of the antenna array 306 comprises a dedicated power supply 304. The power supply 304 supplies power having a certain phase and amplitude to a respective antenna element 302. In an aspect, the power supply comprises a power amplifier. In an aspect not depicted in the figures, the base station 300 may further comprise a processor.

In certain aspects, the antenna array 306 may communicate or is capable of communicating with devices, using a 5G wireless communication protocol. While in this example, 5G is mentioned as a wireless communication protocol, it should be understood that any wireless communication protocol standard may be utilized for example, 3G, 4G, LTE, 5G, 802.11, or any other operator-elected wireless communication protocol standard. In the aspect depicted in FIG. 3, the antenna array 306 can include 64 antenna elements each with a distinct direction which may be known, and where each antenna element is capable of communicating with one or more devices, e.g., using the 5G wireless communication protocol. In the same or alternative aspects, a device may communicate with more than one antenna element of the antenna array 306. In aspects, utilizing a high density antenna array, such as the antenna array 306 with a 5G wireless communication protocol can provide for more refined, relevant information when discerning a location of a device based on RF signal strength values of communications between the device and an antenna element of the antenna array 306, compared to other less dense antenna arrays, and/or antenna arrays or elements utilizing other wireless communication protocols.

Figure 4:
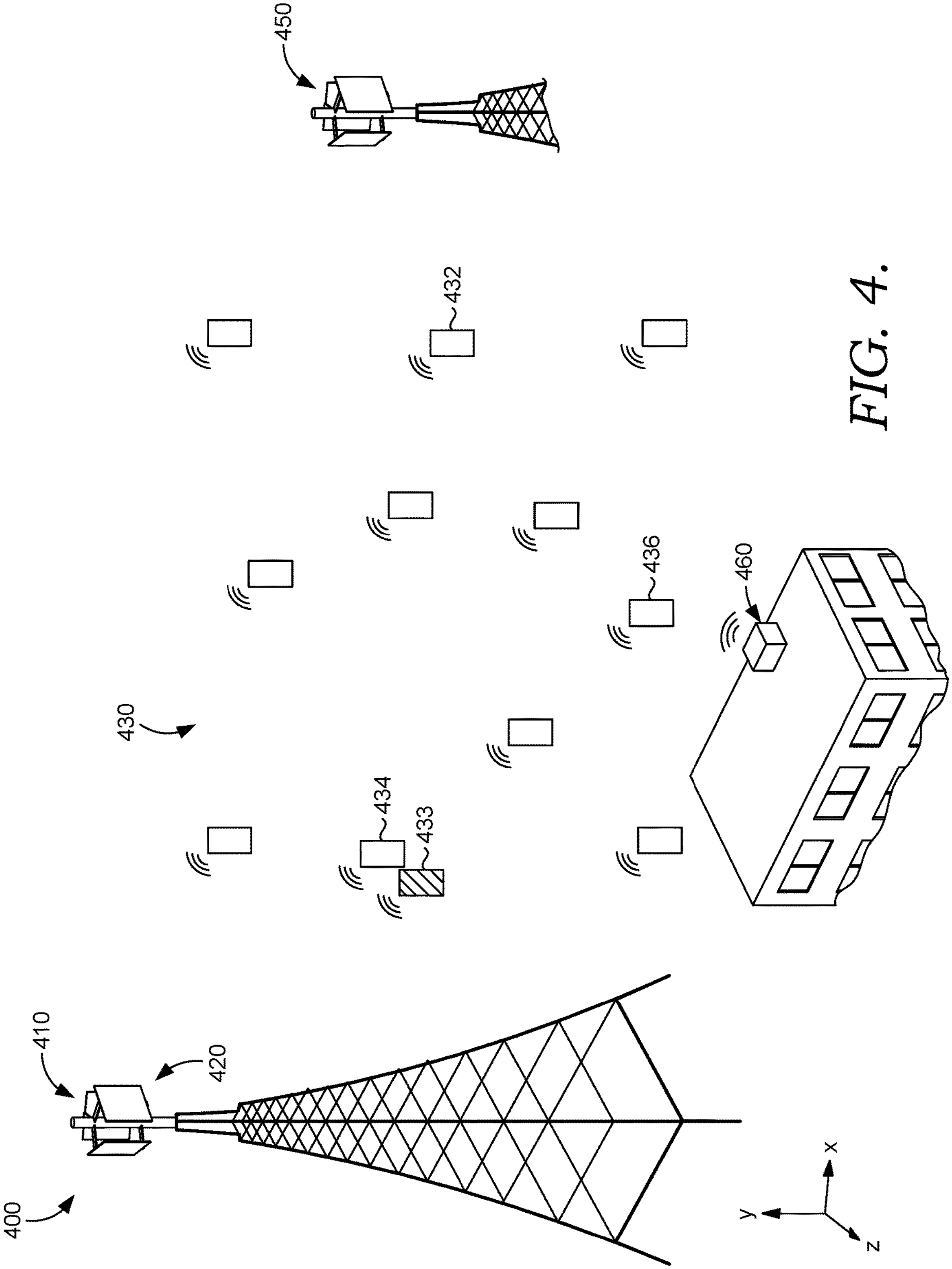
FIG. 4 depicts a system that includes a base station and a plurality of user devices in varying locations, as well as a neighboring base station and a neighboring wireless local area network (LAN), in accordance with aspects herein.

FIG. 4 depicts a system 400, e.g., a telecommunications system, which includes a base station 410 for providing wireless communication services to a plurality of user devices. In the aspect depicted in FIG. 4, the base station 410 includes an antenna array 420. In aspects, the base station 410 can include any or all of the properties and parameters of the base station 300 described above with reference to FIG. 3 and/or the network environment 200, including the cell site 214, described above with reference to FIG. 2. In the aspect depicted in FIG. 4, the base station 410 and/or antenna array 420 is communicating with a plurality of UEs 430. In one or more aspects, one or more of the UEs 430 may not have GPS capabilities. In such aspects, the one or more of the UEs 430 that may not have GPS capabilities may not have GPS capabilities temporarily, e.g., due to communication obstruction, or permanently in the sense that such UEs lack the hardware and/or software for GPS.

In aspects, as discussed above, the systems and methods disclosed herein may determine a location of a device based at least partly on information associated with the device, e.g., RF signal strength values associated with communication between the device and an antenna element. In the same or alternative aspects, the systems and methods disclosed herein may utilize information associated with an antenna array and/or with information associated with other devices when determining a location for a device in question.

For example, in one example scenario, device 432 may communicate with one or more antenna elements of the antenna array 420. In such an aspect, RF signal strength values associated with such communications can be utilized to determine a location of the device 432. For instance, as discussed above, the RF signal strength values can be analyzed in relation to RF signal strength values of other devices communicating with the antenna array 420, e.g., at a prior time, and the location information of the other devices can be utilized to discern the location of the device 432. In aspects, this determination of the location of the device 432 may further include utilizing information associated with the antenna array 420. For instance, in aspects, the known location of the antenna array 420, an azimuth of the antenna array 420, an angular direction of the antenna array 420, or a combination thereof may be utilized alone or in addition to the information associated with the device 432 in discerning a location for the device 432.

In a further aspect, as discussed above, relative positional information may also be utilized in discerning a location of the device 432, which may further facilitate a more accurate location determination. For instance, the device 432 may detect and/or communicate with a neighboring cell site 450, and such information may be provided to all or part of the systems described herein, e.g., the location analyzer 212 of FIG. 2, where such information can be utilized in discerning a location of the device, in addition to the information associated with the device 432 discussed above.

In aspects, the systems and methods described herein can discern the location of a device using any location specifying units or system. For instance in one aspect, the location of a device, e.g., the device 432, can be identified as particular x, y, and z coordinates relative to a fixed known object, such as x, y, and z coordinates relative to the location of the base station 410. In the same or alternative aspects, the location of a device, e.g., the device 432, can be identified by latitude and longitude values. Further, in various aspects, as discussed above, a confidence score or other statistical or quality metric can be provided along with the determined location.

In another example, the device 436 can be in communication with one or more antenna elements of the antenna array 420, where RF signal strength values associated with such communication can be utilized to discern the location of the device, with or without additional information associated with the device 436, the antenna array 420, and/or information associated with other devices, as discussed herein. Further, in this example, the device 436 may detect a neighboring wireless LAN, e.g., the wireless LAN 460. In such aspects, this relative positional information, in addition to the RF signal strength values, can be utilized to discern the location of the device 432. In such aspects, the device 436 may have detected an SSID from the wireless LAN 460, and such information was provided to a location analyzer, e.g., the location analyzer 212 of the system 200 of FIG. 2.

In various aspects, as discussed above, the systems and methods disclosed herein can include the use of reference device information when discerning the location of a device. For instance, as discussed above, the reference device information can include testing devices positioned at known locations when in communication with the antenna array, e.g., the antenna array 420. In one example, at a first time, the reference device 433 may have been utilized to communicate with one or more antenna elements of the antenna array 420, while the specific location of the reference 433 device was known. The RF signal strength values associated with the communications between the reference device 433 and the antenna array 420, along with the known location information, can be provided to the systems described herein and can be utilized in discerning a location of another device, e.g., the device 434. For example, RF signal strength values associated with communications between the device 434 and the antenna array 420 at a second, later time can be utilized in combination with the information associated with the reference device 433 from a first, earlier time to discern the location of the device 434, alone or in addition to other information to discern a location of the device 434. It should be understood that while only one reference device 433 is depicted in FIG. 4 or that is described in the example immediately above, it is contemplated that a number of reference devices and/or a number of reference device RF signal strength values and location information may be utilized at a single antenna array for use in the systems and methods described herein.

Figure 5:
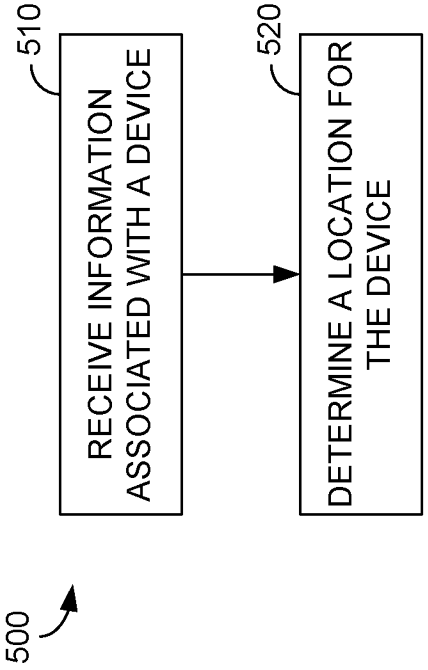
FIG. 5 depicts a flow diagram of an exemplary method for determining a location of a device, in accordance with aspects of the present disclosure.

FIG. 5 is a flow chart of a method 500 for determining a location of a device. In the step 510 of the method 500, information associated with a device is received. In aspects, the information can be received by the receiver 216 of the location analyzer 212 of the system 200 discussed above with reference to FIG. 2. In various aspects, the information associated with the device can include one or more radio frequency (RF) signal strength values associated with communication between the device and one or more antenna elements of an antenna array. In the same or alternative aspects, the information associated with the one or more devices can include a make and/or model of the device, a make and/or model of the antenna within the device, age of the device, battery life, battery strength being utilized at the time of the communication between the device and the at least one antenna element of an antenna array, operating system utilized by the device, maintenance version utilized by the device, or a combination thereof.

Step 520 of the method 500 includes determining a location of the device. In aspects, the determiner 218 of the location analyzer 212 of the system 200 of FIG. 2 can be utilized to determine a location of the device. In aspects, the step 520 can include determining the location of the device based at least partly on information associated with the device, e.g., any or all of the information received in the step 510. In various aspects, as discussed above, determining a location of the device may also include determining a confidence score of the determined location. In one or more aspects, the location can optionally be assigned to the device, e.g., via the assigner 220 of the location analyzer 212 of the system 200 of FIG. 2. In such aspects, the location can be provided to the device and/or to the systems described herein, e.g., the system 200 of FIG. 2 or a portion thereof, such as the database 210.

Figure 6:
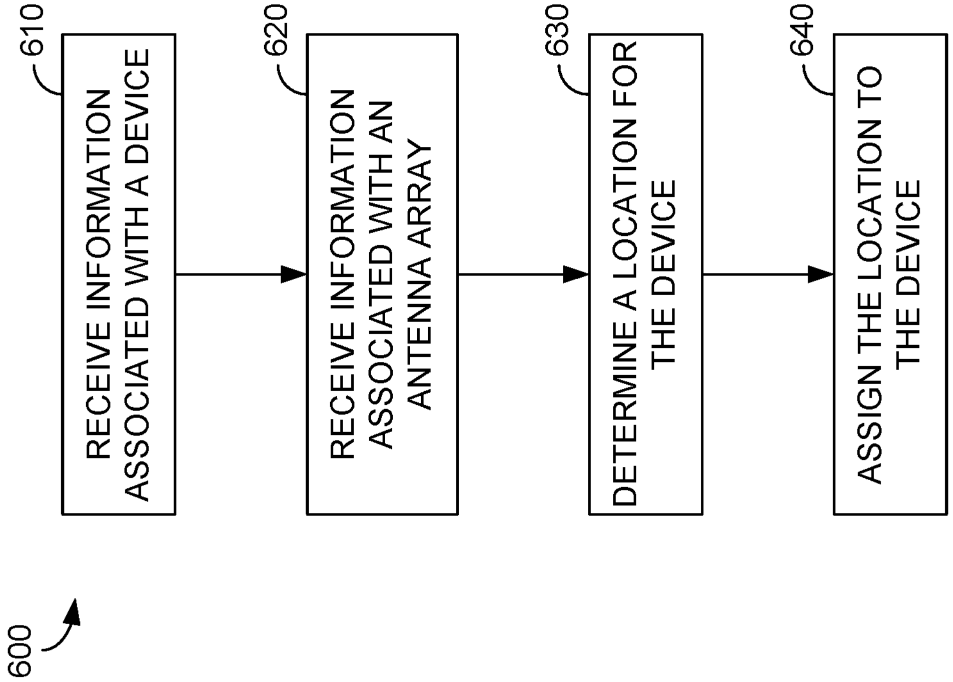
FIG. 6 depicts a flow diagram of another exemplary method for determining a location of a device, in accordance with aspects of the present disclosure.

FIG. 6 is a flow chart of a method 600 for determining a location of a device. The method 600 includes the step 610 of receiving information associated with a device. In aspects, the information associated with the device can be received by the receiver 216 of the location analyzer 212 of the system 200 discussed above with reference to FIG. 2. In various aspects, the information associated with the device can include one or more radio frequency (RF) signal strength values associated with communication between the device and one or more antenna elements of an antenna array. In the same or alternative aspects, the information associated with the one or more devices can include a make and/or model of the device, a make and/or model of the antenna within the device, age of the device, battery life, battery strength being utilized at the time of the communication between the device and the at least one antenna element of an antenna array, operating system utilized by the device, maintenance version utilized by the device, or a combination thereof.

In step 620 of the method 600, information associated with an antenna array is received. In aspects, the information associated with the device can be received by the receiver 216 of the location analyzer 212 of the system 200 discussed above with reference to FIG. 2. In certain aspects, the information associated with the antenna array can include information associated with the antenna array to which the device is communicating. In various aspects, the information associated with the antenna array can include, but is not limited to, a location of the antenna array, e.g., latitude and longitude values, an azimuth of the antenna array, an angular direction of the antenna array, or a combination thereof.

The step 630 of the method 600 includes determining a location of the device. In aspects, the determiner 218 of the location analyzer 212 of the system 200 of FIG. 2 can be utilized to determine a location of the device. In aspects, the step 620 can include determining the location of the device based at least partly on information associated with the device, and on information associated with the antenna array. In various aspects, as discussed above, determining a location of the device may also optionally include determining a confidence score of the determined location.

The step 640 of the method 600 includes assigning the location to the device. In aspects, the assigner 220 of the location analyzer 212 of the system 200 of FIG. 2 can be utilized to assign the location of or to the device. In such aspects, the location can be provided to the device and/or to the systems described herein, e.g., the system 200 of FIG. 2 or a portion thereof, such as the database 210. In various aspects, a confidence score along with the location may be assigned to the device in the step 640.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for determining a location of a device, the system comprising:

one or more antennas; and one or more computer processing components configured to perform a method comprising:

detecting, by the one or more antennas, a first wireless local area network;

detecting, by the one or more antennas, a second wireless local area network; and determining, at least partly based on the detection of the first wireless local area network and the detection of the second wireless local area network, a location for the device, wherein determining the location comprises receiving information associated with the device, the information including one or more radio frequency (RF) signal strength values associated with communication between the device and at least one antenna element of an antenna array, and comparing the one or more RF signal strength values to RF signal strength values and associated location information stored in a database for a plurality of other devices; and determining a confidence score that indicates a level of confidence in the determined location of the device, wherein the confidence score is determined based at least on a number of distinct other devices used in discerning the location of the device and information that is associated with the distinct other devices including a confidence score for location information for at least one of the distinct other devices.

2. The system according to claim 1, wherein detection of at least one wireless local area network includes the device being in range of and/or detecting a Wi-Fi service set identifier (SSID).

3. The system according to claim 1, wherein the location of the device is determined based at least on the relative positional information of the first wireless local area network and the second wireless local area network.

4. The system according to claim 1, further comprising detecting, by one or more antennas, a third wireless local area network, and determining at least partly based on the detection of one or more of the first wireless local area network, the detection of the second wireless local area network, and the detection of the third wireless area network, a location for the device.

5. The system according to claim 1, wherein the first wireless local area network and the second local area network communicate with the system according to an 802.11 wireless communications protocol.

6. The system according to claim 1, further comprising upon the device detecting a neighboring cell site, communicating location information of the device to the cell site.

7. The system according to claim 1, wherein the first wireless local area network is 5G.

8. The system according to claim 1, wherein the second wireless local area network is 5G.

9. The system according to claim 4, wherein the third wireless local area network is 5G.

10. A method for determining a location of a device comprising:

detecting, by one or more antennas, a first wireless local area network;

detecting, by the one or more antennas, a second wireless local area network;

determining, at least partly based on the detection of the first wireless local area network and the detection of the second wireless local area network, a location for the device, wherein determining the location comprises receiving information associated with the device, the information including one or more radio frequency (RF) signal strength values associated with communication between the device and at least one antenna element of an antenna array, and comparing the one or more RF signal strength values to RF signal strength values and associated location information stored in a database for a plurality of other devices; and determining a confidence score that indicates a level of confidence in the determined location of the device, wherein the confidence score is determined based at least on a number of distinct other devices used in discerning the location of the device and information that is associated with the distinct other devices including a confidence score for location information for at least one of the distinct other devices.

11. The method of claim 10, wherein information associated with the location of the device further comprises a detection by the device of at least the first wireless local area network (LAN), a detection by the device of a neighboring cell site, or a combination thereof.

12. The method of claim 10, wherein the location of the device comprises latitude and longitude values.

13. The method of claim 10, wherein the location of the device comprises x, y, and z coordinates of the device relative to a fixed known location.

14. The method of claim 10, wherein the determining comprises comparing location information associated with one or more of the wireless local area networks (LANs), the information further comprising associated radio frequency (RF) signal strength values associated with communications between the one or more antennas and the one or more wireless LANs.

15. The method of claim 10, wherein the determining further comprises: determining an azimuth or an angular direction between the one or more antennas and each of the first and second local area networks.

16. The method of claim 10, wherein the confidence score is at least partly based on the information associated with the other wireless LANs.

* * * * *